US008234678B2

(12) United States Patent
Morard et al.

(10) Patent No.: US 8,234,678 B2
(45) Date of Patent: Jul. 31, 2012

(54) METHOD FOR BROADCASTING VIDEO DATA SEQUENCES BY A SERVER TO A CLIENT TERMINAL (75) Inventors: Jean-Pierre Morard, Paris (FR); Stéphane Vialle, Metz (FR); Olivier Pietquin, Brulange (FR); Virginie Galtier, Nancy (FR)

(73) Assignee: Sagem Communications SAS, Rueil-Malmaison (FR)

( * ) Notice: Subject to any disclaimer, the term of this patent is extended or adjusted under 35 U.S.C. 154(b) by 168 days.

(21) Appl. No.: 12/677,214

(22) PCT Filed: Jul. 31, 2008

(86) PCT No.: PCT/FR2008/051447
§ 371 (c)(1),
(2), (4) Date: Aug. 18, 2010

(87) PCT Pub. No.: WO2009/034275
PCT Pub. Date: Mar. 19, 2009

(65) Prior Publication Data
US 2010/0333147 A1 Dec. 30, 2010

(30) Foreign Application Priority Data
Sep. 10, 2007 (FR) ...................................... 07 57469

(51) Int. Cl.
*H04N 7/18* (2006.01)
(52) U.S. Cl. .......... 725/78; 725/103; 725/110; 725/115; 725/116
(58) Field of Classification Search .................... 725/78, 725/103, 110, 115, 116
See application file for complete search history.

(56) References Cited

U.S. PATENT DOCUMENTS
7,047,307 B2 * 5/2006 Li ................................. 709/231

FOREIGN PATENT DOCUMENTS
EP    1 821 490    8/2007

OTHER PUBLICATIONS

Kaplinsky, "VNC Tight Encoder—Data Compression for VNC", Section 6 Informatics and Control in Engineering Systems, Modern Technique and Technologies, Feb. 26, 2001, p. 155-157.

* cited by examiner

*Primary Examiner* — Joseph P Hirl
*Assistant Examiner* — Jivka Rabovianski
(74) *Attorney, Agent, or Firm* — Pillsbury Winthrop Shaw Pittman, LLP (57) ABSTRACT A method for broadcasting video data sequences by a server to a client terminal via a network includes generating a request by the client terminal following an event, sending the request to the server, the request including a video sequence broadcasting order to the client terminal, the video sequence defining a transition between a current or "father" state and a subsequent or "child" state, each state being associated with a static final image and the aforementioned server including a memory configured to store an identifier of each state, a transition table starting from each state, compressed data corresponding to a video sequence associated with a transition from one state to another, and verifying by the server that the child state associated with the broadcasting order is a known state in the transition table starting from the parent state.

12 Claims, 3 Drawing Sheets

METHOD FOR BROADCASTING VIDEO DATA SEQUENCES BY A SERVER TO A CLIENT TERMINAL

CROSS-REFERENCE TO RELATED APPLICATIONS

This is the U.S. National Stage of PCT/FR2008/051447, filed Jul. 31, 2008, which in turn claims priority to French Patent Application No. 07/57469, filed Sep. 10, 2007, the entire contents of both applications are incorporated herein by reference in their entireties.

TECHNICAL FIELD

This invention relates to a method for broadcasting video data sequences by a server to a client terminal across a network. The home video network market is booming. The multiplicity of media within the home environment is opening up numerous possibilities in this respect. The existence of a network brings with it the possibility of interconnecting different media within the same home (home networking). This sort of network exists in the form of a server (a personal computer or PC, for example) and client terminals (a video decoder, for example) interlinked through the aforementioned network using HDMI (High Definition Multimedia Interface), WIFI, Ethernet or PLC (power line communications) technology, for example.

BACKGROUND TO THE INVENTION

By creating an office, this sort of architecture enables services to be offered to a distant terminal from a PC server acting as a media centre (a hardware system with the job of reading multimedia files: video, sound, image, sound). This sort of office comprises an on-screen presentation forming a user interface for the client terminal, a menu enabling a user to execute a command. This office is managed by the server, but receives remote commands from the client terminal across the network. This type of architecture makes it possible to operate with terminals that do not necessarily have significant calculating resources (thereby resulting in lower cost terminals), the majority of the applications being sent and supported by the server transmitting the processed data to the terminal.

A media centre comprises a control unit and an operating unit to act on the command. Typically, the control unit may include an on-screen display, for example an office display, with control buttons. This control unit includes a device, such as a remote control, for activating the control buttons displayed. The media centre's operating unit manages the actions generated by actuation of the displayed buttons, such as turning up the sound or moving from one video sequence to another via a change of state.

This sort of media centre may, for example, be displayed on a television screen or on another display means producing a user interface. The user may interact with the displayed data, for example, using the remote control.

User management of a media centre is achieved at client terminal level. A user interface can be defined as a tree of possible user commands. The user thereby interacts with this user interface by giving execution orders using the remote control, for example, from among the possible options displayed by the user interface. These orders are received by the client terminal and lead to the creation of user interactions by the client terminal. From now on the terms "user interaction" and "user event" will be interchangeable.

Following the creation of a user event (by pressing a button on the remote control, for example), the client terminal sends a request to the server, in order to initiate processing of the aforementioned event. It is the server which, in processing the request sent by the client terminal, processes the user order. Once the request has been processed, the server sends a response to this request to the client terminal. The server response is produced by processing the user event and, particularly, by encoding the video data to be broadcast by the client terminal following the user event. This response is received and decoded by the client terminal, which displays the processing result on the user interface.

In this sort of system, the server encodes, in other words, compresses what it broadcasts before sending it to the terminal. If the server had to display on its own screen the images that it broadcasts, it would not be necessary for it to compress them. The transfer units in the internal bus of the server actually tolerate a high output. In order to compress, the server captures its own display, encodes it and sends it to the client terminal, for example to an IP address of the client terminal for an Ethernet network. Encoding is therefore carried out from an image defined sequentially pixel by pixel or rather in bitmap format. This sort of image defined sequentially pixel by pixel is well-adapted for display on a monitor.

The encoding carried out by the server is the spatio-temporal type (according to standard H264, for example); spatio-temporal encoding only fully encodes part of the images being transmitted, in order to recreate a video. Standard H264 is a video coding standard jointly developed by the VCEG (Video Coding Experts Group) and the MPEG (Moving Pictures Experts Group). This standard facilitates the encoding of video streams with an output more than two times lower than that obtained by the MPEG2 standard for the same quality and transmission of data at high speed over a simplified link, such as HDMI. During encoding, an image is broken down into macro-block units and each macro-block is encoded. Spatio-temporal encoding only fully encodes part of the images being transmitted, in order to recreate a video. Standard H264 includes the types of images known and defined in standard MPEG2, specifically:

I (Intra) images, in which the coding does not depend on any other image,
P (Predictive) images, in which the coding depends on images received previously,
B (Bi-predictive) images, which depend on images received previously and/or subsequently.

On receipt, the client terminal must decode the video data sent by the server. The decoding of this data by the client is generally carried out by a dedicated electronic circuit of a graphics card in the terminal. Once the data has been decoded, the terminal broadcasts it via its broadcasting means onto the screen.

However, the encoding of data by the server requires significant power. Furthermore, encoding generally requires an execution time not allowing for encoding, transmission and decoding in real time. Encoding therefore typically requires of the server device five times more power than is required of the client device for decoding.

Today's media centres contain a large number of animations. These animations are, for example, the result of a user click, an animation on a button, a background moving periodically or quite simply the movement of a window. A great number of these animations take place following a user event. These animations are in fact short video sequences that the server must encode and transmit to the client device, in order for it to be broadcast via the user interface. However, following such user events, only part of what is displayed by the server device undergoes change. In fact, for example, for a menu that drops down following a user click on a tab on this menu, only the part where the menu drops down changes; the rest of the image remains fixed. Video protocols currently only encode full images; in other words, what has changed following the user event and what has not changed. Even if, after coding according to standard H264, only those sections that have changed are finally inserted in the video stream, the effort involved in determining which parts have changed and which have not slows down the encoding time of the video data being transferred greatly.

During testing, which was conclusive in relation to the main display and remote management function, the display time proved to be excessively long. This display time was in the order of a few seconds for a single high-definition image, not allowing use of this function in the state.

This excessively long display time is explained by two factors. These are firstly the transmission time across the IP link and secondly the processing time for request messages. The decoding of images at client device level is all the longer when the data being decoded are compressed. In the same way, encoding is all the longer when the compression format is complex. Currently, in order to carry out graphic decoding with this type of application, the decoder must include a graphics library enabling compressed video data to be decompressed.

One solution known to anyone skilled in the art for resolving the problems associated with the data transmission time across a network involves reducing the size of the data moving through the network device. By thereby compressing the data following known compression standards, information is obtained that is less costly in terms of disk space. This compressed information therefore moves more quickly across the network. However, this sort of solution makes the compression of video data more complex still and therefore increases the server encoding time. Moreover, this complexity in compression also increases the time required at the client device to decode the data received. Moreover, this solution makes it necessary to integrate the corresponding library in the client device. This solution therefore brings with it the advantage of reducing the data transfer time across the network, but it increases considerably the data processing time at server and client level.

One solution for reducing the encoding and decoding time is to simplify the information being transmitted. Therefore, by using simple encoding, an effective encoding and decoding time is achieved. However, one problem generally linked to a transmission with simple encoding is the data transfer time. In fact, as a general rule, the simpler the encoding, the greater the disk space occupied by the data. The time thereby gained at encoding and decoding level is lost when it comes to the time taken to transfer the information across the network.

By combining a VNC (Virtual Network Computing) client/server application with the H264 protocol at screen capture level, for example, the problem of the full encoding of entire images can be resolved. For example, TightVNC is an application enabling a server computer to be accessed remotely from any client computer connected to the Internet. This means that all movement detection and image calculation functions, etc. are calculated by the H264 library. A full screen image in the video is then sent including only the changes, this image having a high compression rate. Finally, the VNC server only manages events and no longer performs image analysis.

However, this sort of method requires the architecture of the TightVNC server application code to be completely changed. Moreover, there is a risk that the encoding duration will be relatively long at server device level. With a server device having a 2.8 GHz dual-core processor, encoding with minimum options lasts more than a tenth of a second per image at a resolution of 352*288 for a bit rate (binary flow) at 30.0 Hz of 150 kilo octets per second. This sort of method would therefore take something in the order of a second to encode an image with a resolution of 1280 by 720 to read from the VNC video.

None of these solutions therefore seems to effectively solve the problem of managing the transfer of video data at an acceptable speed in a network device.

GENERAL DESCRIPTION OF THE INVENTION

In this context, the present invention aims to provide a method for broadcasting video sequences by a server to a client terminal, enabling the aforementioned problems to be overcome by effectively resolving the problem of managing the transfer of video data at an acceptable speed across a network device.

To this end, the invention proposes a method for broadcasting video data sequences by a server to a client terminal via a network, which comprises the following steps:
  generation of a request by said client terminal following an event,
  sending of said request to said server, the request including a video sequence broadcasting order to said client terminal, said video sequence defining a transition between a current or "father" state and a subsequent or "child" state, each state being associated with a static final image and the aforementioned server including memory means capable of storing:
    an identifier of each state,
    a transition table starting from each state,
    compressed data corresponding to a video sequence associated with a transition from one state to another,
  verification by said server that said child state associated with said broadcasting order is a known state in said transition table starting from said parent state,
  if said child state is a state known by said server and if the compressed data stored in said memory means and corresponding to the video sequence associated with the transition from said parent state to said child state is available: broadcasting of said compressed data by said server to said terminal,
  if said child state is a state known by said server and if the compressed data stored in said memory means and corresponding to the video sequence is not available: broadcasting by said server to said terminal of at least the last image of said video sequence associated with the transition from said parent state to said child state,
  if said child state is not a state known by said server: broadcasting by said server to said terminal of at least the last image of said video sequence associated with the transition from said parent state to said child state.

The term "event" denotes any type of event. It may of course be an event initiated by the user (by activating a button on a remote control, for example), but likewise a system event (loss of connection—software or network event—application interfering with the display, for example).

Thanks to the invention, there is no need for the video stream already sent to be systematically recompressed. The server's memory means, such as a cache memory, which keeps compressed data, and also a transition table indicating all transitions that have already taken place starting from a state (parent state), are advantageously used. This sort of method facilitates greater fluidity of the video stream and a reduction in energy and resource consumption.

Thus the server verifies firstly whether the child state is known; it should indeed be noted that it is possible to move from a parent state to several different states. Let us take, by way of example, the case of an exit from an application. In this case, it is common for the following state to be that corresponding to the previous image visualised by the user before entering the application. This previous image is of course not always the same.

The invention anticipates that if the request sent by the client terminal has never been processed in the past, the server will at least send a quick reply to the client device including the final image of the sequence awaited by the user. This will be in fail soft mode, providing the user with a satisfactory result.

In order to reduce the server's encoding task significantly, the invention envisages using the server's cache memory to keep the video sequences that have already been previously encoded. If the compressed data stored in the cache memory and corresponding to the video sequence is available, the server broadcasts them to the client terminal. "Available data" either means that data is already stored in its entirety in the cache memory or that the time needed to compress this data at server level is less than the time needed to play said data at client terminal level.

The method according to the invention may likewise present one or several of the following characteristics, considered either individually or in all the technically feasible combinations.

Said memory means advantageously include a buffer memory acting as a queuing system capable of receiving said video sequences before they are compressed, the method according to the invention comprising the following steps:
- if said child state is a state known by said server and if the compressed data stored in said memory means and corresponding to the compression of the video sequence associated with the transition from said parent state to said child state is not available: verification by the server in said queue of whether said video sequence is present,
- if said video sequence is in said queue: broadcasting by said server to said terminal of the last image in said video sequence associated with the transition from said parent state to said child state,
- if said video sequence is not in said queue: inclusion of said sequence in the queue in preparation for its compression and broadcasting from said server to said terminal of the last image of said video sequence associated with the transition from said parent state to said child state.

Advantageously, said memory means will be capable of storing an index of the final image of each state, the method comprising the following steps:
- if said child state is a state known by said server: calculation of an index associated with the final image of said video sequence and comparison of this calculated index with the index of the final image of the child state stored in said memory means,
- if the two indices are different: updating of the recorded index of the final image and removal of all compressed data associated with transition sequences entering and exiting this child state.

The method according to the invention will advantageously include the following step: if said child state is not a state known by said server: creation of a new transition between said parent state and said child state, said transition being stored in said memory means without said child state being modified.

According to a first embodiment, said memory means are capable of storing a final image index of each state, the method according to the invention comprising the following steps:
- if said child state is not a state known by said server: calculation of an index associated with the final image of said video sequence and verification by said server that said index is an index stored in said memory means,
- if said calculated index is known by said server: creation of a new transition between said parent state and said child state, said transition being stored in said memory means without said child state being modified,
- if said calculated index is not known by said server: creation of a new state and a new transition between said parent state and said child state, the identifier of said new state and said transition being stored in said memory means.

Said memory means will preferably include a buffer memory acting as a queuing system capable of receiving said video sequences before they are compressed, the method according to the invention comprising the following steps:
- if said child state is not a state known by said server: calculation of the size of said video sequence for broadcasting,
- if the size of said video sequence falls below a predetermined threshold and if said video sequence is not already in said queue or in the process of compression: compression of said video sequence and broadcasting by said server to said terminal of the compressed data associated with said video sequence in addition to the broadcasting of the last image of said video sequence associated with the transition from said parent state to said child state,
- if the size of said video sequence exceeds the aforementioned predetermined threshold and if said video sequence is not in the queue or in the process of compression: inclusion of said sequence in the queue in preparation for its compression and broadcasting by said server to said terminal of the last image of said video sequence associated with the transition from said parent state to said child state.

According to a second embodiment, said memory means are suitable for storing an index of the final image of each state, including a buffer memory acting as a queuing system capable of receiving said video sequences before they are compressed, said child state associated with the creation of a new transition between said parent state and said child state taking any value at first, the method according to the invention then comprising the following steps:
- calculation of the size of said video sequence for broadcasting,
- if the size of said video sequence falls below a predetermined threshold and if said video sequence is not already in said queue or in the process of compression: compression of said video sequence and broadcasting by said server to said terminal of the compressed data associated with said video sequence in addition to the broadcasting of the last image of said video sequence associated with the transition from said parent state to said child state,
- if the size of said video sequence exceeds the aforementioned predetermined threshold and if said video sequence is not in said queue or in the process of compression: inclusion of said sequence in the queue in preparation for its compression and broadcasting by said server to said terminal of the last image of said video sequence associated with the transition from said parent state to said child state, calculation of an index associated with the final image of said video sequence and verification by said server that said index is an index stored in said memory means, if said calculated index is known by said server: updating of any value of said child state, the transition from the parent state to the updated child state being stored in said memory means without said child state being modified, if said calculated index is not known by said server: updating of any value of said random child state and creation of a new child state, the identifier of said new state and the transition between the parent state and the child state being stored in said memory means.

According to a first variant, said memory means are capable of storing a variable indicating the date when the compressed data stored was last used, the method according to the invention including a step for freeing up space in said memory means, said freeing-up step being performed by deleting in order of priority the compressed data displaying the oldest date of last use.

According to a second variant, the method according to the invention includes a step for freeing up space in said memory means, said freeing-up step being performed depending on the time needed for compression of the compressed data stored in said memory means.

Some of the compressed data may be stored in the memory means located in said client terminal.

The compression of data by the aforementioned server may be performed according to standard H264.

The compression of data may only take place in modified zones of video sequence images.

BRIEF DESCRIPTION OF THE FIGURES

Other characteristics and advantages of the invention will clearly emerge from the description given below by way of a guide without any restrictive force, with reference to the attached figures.

In all the figures, the common elements share the same reference numbers.

DESCRIPTION OF THE PREFERRED EMBODIMENTS OF THE INVENTION

Figure 1:
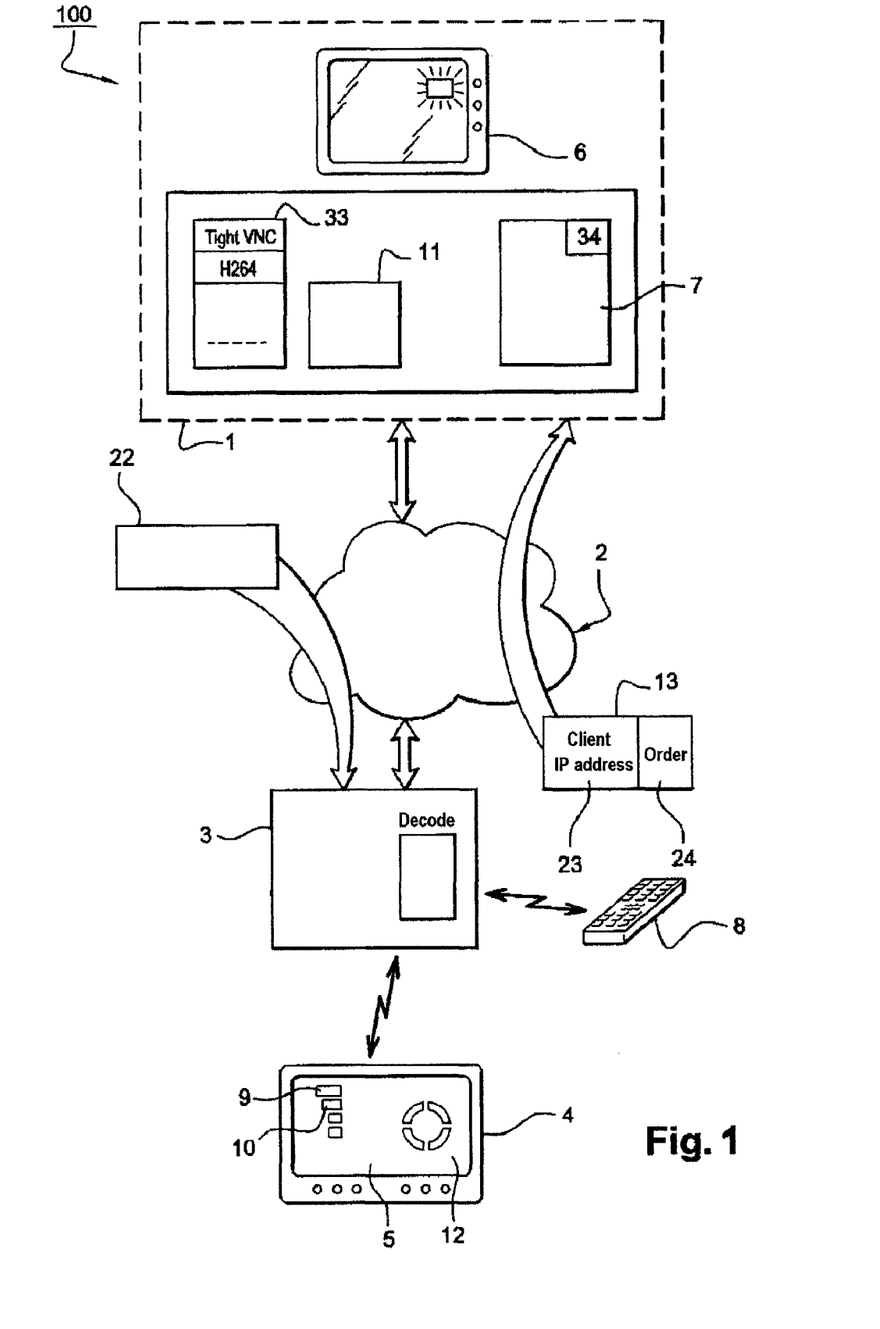
FIG. 1 is a simplified schematic representation of a network configuration for implementation of the broadcasting method according to the invention.

FIG. 1 is a simplified schematic representation of a network configuration 100 for implementation of the broadcasting method according to the invention. This sort of configuration 100 comprises:
a server 1 linked via a network 2 to a client terminal 3,
a means 4 of broadcasting from a user interface 5,
a remote control 8.

The server 1 may be, for example, a computer and the client terminal 3 may be, for example, a numeric television decoder. The network 2 enables video data (more generally video/audio data) to circulate between the server 1 and the client terminal 3. The broadcasting means 4 is a television, for example.

The server 1 includes:
its own broadcasting means 6, such as a computer monitor, for example,
a cache-type memory 7,
a queuing buffer memory 11,
a program memory 33, including, notably:
a compressor using H264, MPEG2, MPEG, etc. encoding . . . .
a TightVNC-type application.

The user may interact with the user interface 5 by means of the remote control 8. These user interactions (or events) are received by the client terminal 3, which transmits the request 13 generated by these user events to the server 1; as soon as the request message 13 has been created by the client terminal 3, the latter sends it to the server 1. Request messages 13 circulate through the network 2 between the terminal 3 and the server 1.

The request messages 13 sent by the client terminal 3 include different information. This information enables the server 1 to process the data contained in this message 13 and to send a response message 22 to the client terminal 3. We will return to the content of this message 22 later. A request message 13 includes the address 23 to which the server 1 must respond, typically the IP address of the terminal 3, and an order 24 to be executed following a user event.

At the time of the user event leading to an animation, the server 1 may separately encode an animation and a mask; the mask corresponds to the background of the image, which remains fixed during the animation. By combining, for example, the TightVNC application with protocol H264 at send function level, the server 1 only sends those parts that have changed following a user event, as well as the position in which this sequence should be placed. This separate encoding means that the entire image being displayed during the animation does not have to be encoded. The server 1 then only encodes the animation itself without re-encoding, for each image in a display including an animation, the entire image to each display.

The video data received by the client terminal 3 is reconstructed by the client terminal 3 on an event basis; in other words, the client terminal 3 enables the user to navigate following a tree of possible events. For example, the user interface 5 may be presented in the form of a menu 9, which the user navigates by operating buttons 10 on the menu 9 with the help of the remote control 8. The operation of these buttons 10, which forms an event, may be translated in the form of a small animation corresponding to a video sequence. These animations may be present, for example, during the activation of a button 10, movement over a button 10, or also on an animated screen background. These sorts of animations are video sequences displayed as a function of user events. However, these animations only generally modify a small part of the image 12 displayed by the user interface 5, while the rest of the image 12 undergoes no change.

In principle, the user event (action on the remote control 8) must generate the sending of a video sequence.

The method according to the invention uses a programmed logic controller 34 situated in the cache memory 7 and functioning by learning. As we will see in greater detail with reference to FIGS. 2 to 4, the graph of states of the logic controller 34 is going to be created gradually: the state will change as soon as an event is triggered (i.e. as soon as a remote control signal generates a request).

The links between the states are characterised by a user event and a video sequence. The user event corresponds, for example, to the remote control signal to move from a current state ("parent state") to a following state ("child state") and the video sequence is the transitional sequence between the two states.

The cache memory 7 is capable of retaining a series of states, each state being characterised by:
an identifier number,
an indexation of its final image (each state effectively includes a static final image),
a table of known transitions starting from this state.

The indexation of an image makes it possible for it to be identified by giving it a tag: the aim of the indexation is to determine whether two images are different or not. There are numerous methods enabling this type of indexation to be achieved. We quote by way of example methods involving histogram colour analysis, texture analysis, shape analysis or spatial analysis.

The cache memory 7 is equally capable of retaining in its memory a series of transitions, each transition being characterised by:
compressed data corresponding to a video sequence between two states,
a date of last use.

The method of broadcasting video data sequences by the server 1 to the client terminal 3 across the network 2 includes a first step of request 13 generation by the client terminal 3 following an action event on the remote control. The request 13 includes an order to broadcast a video sequence to the client terminal 3, said video sequence creating a transition between a current parent state and a following child state.

Figure 2:
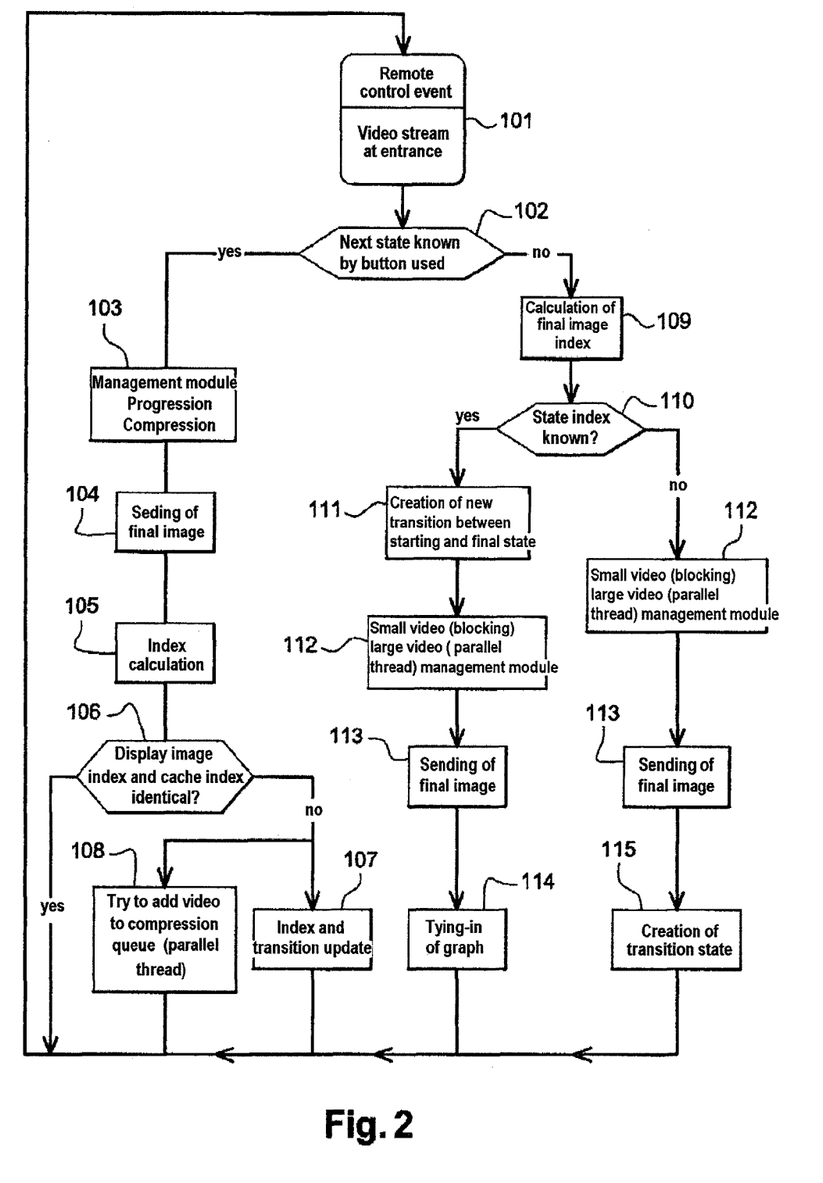
FIG. 2 illustrates the different steps involved in the method according to the invention.

With reference to FIG. 2, according to step 101, the remote control event leads to the presence of a video stream at server 1 level.

According to step 102, the server 1 verifies that the child state associated with the broadcasting order contained in the request 13 is a known state in the transitions table starting from the parent state (said table being included in the server's cache memory 7).

Figure 3:
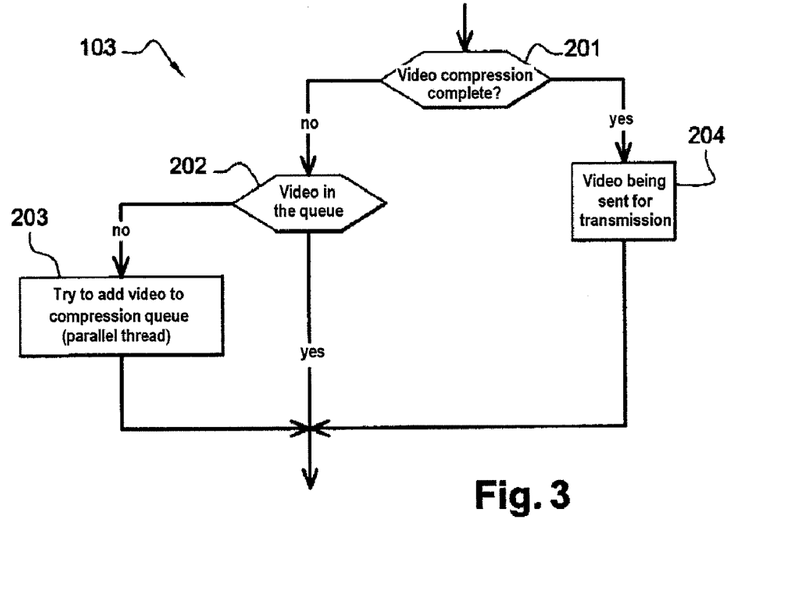
FIG. 3 illustrates the different steps involved in managing the progress of the compression used in the method according to the invention.

If the child state is a state known by the server 1, the next step is 103 involving management of the compression progress: this step 103 is described in greater detail with reference to FIG. 3.

According to step 201, a check is made to see whether the compressed data stored in the cache memory 7 corresponding to the compression of the video sequence associated with the transition from the parent state to the child state is available in the cache memory 7 or not. Available data is taken to mean either that the data is already stored in its entirety in the cache memory 7 or that the time required in order to achieve compression of this data at server 1 level is shorter than the time needed to play said data at client terminal 3 level. In other words, it may be that the data is not completely compressed, but is starting to be broadcast to the client terminal 3, as the time required to complete the compression is less than the overall time needed to read the sequence.

If compressed data is available, according to step 204, this data corresponding to the video sequence associated with the transition from the parent state to the child state is broadcast by the server 1 to the terminal 3. It is advantageous here for the cache memory 7 system to be used, in order to store data corresponding to transitions already requested by the user. It will be noted that according to step 104, the server 1 likewise sends the last image of the video sequence to the terminal 3: this final image is the one arriving at the entrance to server 1.

If the compressed data is not available, the process moves on to step 202, which involves the server 1 checking the queue 11 to see whether the video sequence is present or not. The video sequences are placed in the queue before being encoded.

According to step 203, if the video sequence is not in the queue 11, this sequence is placed in the queue 11 in preparation for its compression: the process then moves on to step 104 involving broadcasting by the server 1 to the terminal 3 of the last image in the video sequence associated with the transition from the parent to the child state. This is therefore a fail soft broadcasting mode, which involves only transmitting the last image in the sequence to the user. An a priori observation, to the extent that the child state associated with the broadcasting order contained in the request 13 is a known state in the transition table starting from the parent state, is that it would be logical for the video sequence to be at least in the queue 11: however, the video sequence may not be in the queue 11 if it was full when an attempt was made to add it.

If the video sequence is in the queue 11, but the anticipated end of its compression does not permit the broadcasting of compressed data, the process likewise moves straight on to step 104 involving broadcasting by the server 1 to the terminal 3 of the last image in the video sequence associated with the transition from said parent state to said child state. This is therefore likewise in fail soft mode, but there is no point in placing the video sequence in the queue 11, as it is already there.

After step 104 involving the systematic sending of the last image in the video sequence from the server 1 to the terminal 3, the process moves on to step 105, during which an index for the final image of the video sequence is calculated: according to step 106, the server 1 compares the calculated index with the final image index of the compressed data registered in the cache memory 7 and corresponding to the transition between the parent state and the child state (this is, in fact, the index of the final image of the child state stored in the cache memory 7).

If the server 1 detects a change between the two indices, it will then update the child state (step 107); in other words, it will update the registered index of the final image and suppress all the compressed data associated with transition sequences that enter and exit this state (these sequences are regarded as obsolete). According to step 108, when the video sequence has arrived at the entrance to the server 1, it is placed in the queue 11 to be compressed. Two points should be noted in the case of steps 107 and 108:
a new state is not created here (no new identifier), the state is simply updated (changing links to the other states);
this re-encoding makes it necessary to store data in the cache memory 11 and keep the video sequence capture, so that the latter can be re-encoded if it proves to be obsolete.

If the child state is not a state known by the server 1, the process moves on to step 109, which is a step involving calculation of the index associated with the final image of the video sequence (i.e. the index of the final image of the child state stored in the cache memory 7).

According to step 110, the server 1 checks whether the calculated index is an index stored in the cache memory 7.

According to step 111, if the calculated index is known by the server 1, the server 1 simply creates a new transition between the parent state and the child state, said transition being stored in the cache memory 7 without changing the existing child state. This is an example of an unknown user event with a final image index corresponding to the index of a state already in the memory. The graph of states associated with the logic controller 34 is therefore being tied in; in other words, several possible paths arrive at the same child state and the index of the final image of the state is therefore already known by the server 1.

Figure 4:
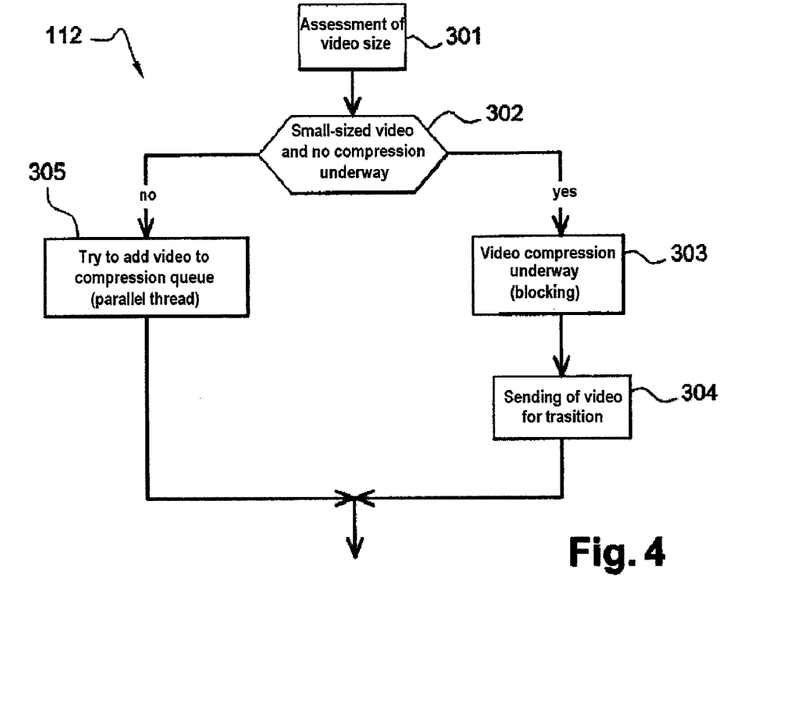
FIG. 4 illustrates the different steps involved in the management of the video sequences according to their size used in the method according to the invention.

The process then moves to step 112 involving the management of video sequences according to their size, which is described in greater detail with reference to FIG. 4.

Step 301 involves assessing the size of the video sequence being broadcast.

According to step 302, the size of the video sequence is compared with a predetermined threshold and a check is made to determine whether the video sequence is already in the queue 11 or in the process of being compressed.

According to step 303, if the size of the video sequence falls below the aforementioned predetermined threshold and if the video sequence is neither in the queue 11 nor in the process of compression, the server 1 launches the compression of the small video sequence then broadcasts (step 304) the compressed data associated with the sequence to the terminal 3, in addition to the final image of the video sequence (step 113). The condition enabling the compression of the video sequence to be launched is that the user reading is not in fail soft mode; in other words, the sequence compression time must be shorter than the reading time for said sequence. The sending of the video to the user according to step 304 may of course be done little by little, as the sequence is encoded, this encoding being undertaken by GOP (Group Of Pictures) with the compressed GOP data being sent gradually.

According to step 305, if the size of the video sequence exceeds the aforementioned predetermined threshold and if the video sequence is not in said queue or in the process of compression, the server 1 adds (or attempts to add, as there may be no places in the queue) the sequence to the queue 11 in preparation for its compression for subsequent broadcasting. Therefore, if the video is too heavy or if the compressor is busy, a video compression task is registered on joining the compression queue 11 (in which case encoding will take place in a parallel thread or light-weight process).

In this case, with reference to step 113, only the final image in the video sequence is broadcast by the server 1 to the terminal 3.

The interesting thing about this step 112, involving management depending on the size of the video sequence, is that it facilitates for short videos encoding and transmission on the fly: the operations are carried out in series for videos that permit it (short ones) and not for others (long ones). Because the encoding time for long videos is more significant, it is preferable for these videos to be placed in the queue 11 and for the last image to be quickly transferred in fail soft mode. In fact, the ergonomics would be even more compromised if the user had to wait for the encoding to end, in order to show a long video, and it is preferable for the user to benefit from the encoding when the associated transition is next visited.

As mentioned earlier, the fact that the index of the final image corresponds to the index of a state in the cache memory indicates that this is a case in which the graph is being tied in, as indicated by step 114.

If the calculated index is not known by the server, the process passes straight on to steps 112, involving the management of video sequences according to their size, and 113, involving sending identical final images to steps 112 and 113 described earlier.

The case here is that the child state is completely unknown; in fact, the user event is unknown and the index of the final image is equally unknown. Consequently, step 115 corresponds to the creation of a new child state and a new transition between the parent state and the child state, the identifier of the new child state being stored in the cache memory 7.

When the cache memory 7, attributed for storage of the logic controller 34 with all the compressed data, is full, the data must be deleted. One possible method of emptying the cache memory 7 follows the rules shown below:

- the structure of the logic controller 34 is maintained, in other words, no state is deleted. Only compressed video transitions can be removed. This therefore works on the principle that the space taken up by the structure of the logic controller 34 is insignificant in relation to the size of the compressed videos.
- A choice is made to delete in order of priority the compressed transition video that has remained unused for the longest; for this purpose, each transition has a "date of last use" field. Each time a transition is passed through, its date of last use is updated.
- If the space freed up by deleting the oldest video is not adequate, a search is made for the one that is currently the oldest and this is then deleted. This process is repeated until sufficient space has been freed up.

Of course, the invention is not limited to the embodiment just described.

In particular, the invention has been described in the case of video data, but it is accepted that it applies equally to video/audio data.

It should therefore be noted that it is equally possible to use other criteria to free up space in the cache memory; hence, another parameter may be the encoding time. In fact, it may be interesting not to have to encode a heavy sequence too often (i.e. one of significant size). It can therefore be decided to keep as a priority the longest video sequences to be compressed. This way of proceeding may clearly also be associated with the taking into account of the date of last use.

It should likewise be noted that the cache memory of the user terminal not used in the embodiment described above can also be used to advantage. Another possible solution therefore involves leaving the logic controller on the server, the latter being able to record data encoded both in its own cache memory and also in the terminal's cache memory.

Moreover, according to the embodiment described with reference to FIG. 2, calculation of the index of the final image is required before the compression is launched. If one considers that the video is streamed, this situation is liable to result in a loss of time, since the final image is at the end of the video sequence.

According to the invention, it is therefore likewise possible to launch the management of the video compression (step 112) before calculating the index of the final image. Launching the compression before the index test means not knowing the child state to which the transition points. One solution, therefore, is to create a transition with a child state parameter fixed on any value, this value being updated as soon as it is known.

Finally, any means may be replaced with an equivalent means.

The invention claimed is:

1. A method for broadcasting video data sequences by a server to a client terminal via a network, the method comprising:
    generating a request by said client terminal following an event,
    sending said request to said server, the request including a video sequence broadcasting order to said client terminal, said video sequence defining a transition between a current or "father" state and a subsequent or "child"

state, each state being associated with a static final image and the aforementioned server including a memory configured to store:
an identifier of each state,
a transition table starting from each state,
compressed data corresponding to a video sequence associated with a transition from one state to another,
verifying by said server that said child state associated with said broadcasting order is a known state in said transition table starting from said parent state,
if said child state is a state known by said server and if the compressed data stored in said memory and corresponding to the video sequence associated with the transition from said parent state to said child state is available: broadcasting said compressed data by said server to said terminal,
if said child state is a state known by said server and if the compressed data stored in said memory and corresponding to the video sequence is not available: broadcasting by said server to said terminal at least the last image of said video sequence associated with the transition from said parent state to said child state,
if said child state is not a state known by said server: broadcasting by said server to said terminal at least the last image of said video sequence associated with the transition from said parent state to said child state.

2. The method according to claim 1, wherein said memory includes a buffer memory acting as a queuing system capable of receiving said video sequences before they are compressed, said method comprising:
if said child state is a state known by said server and if the compressed data stored in said memory and corresponding to the compression of the video sequence associated with the transition from said parent state to said child state is not available: verifying by the server in said queue whether said video sequence is present,
if said video sequence is in said queue: broadcasting by said server to said terminal the last image in said video sequence associated with the transition from said parent state to said child state,
if said video sequence is not in said queue: including said sequence in the queue in preparation for its compression and broadcasting from said server to said terminal the last image of said video sequence associated with the transition from said parent state to said child state.

3. The method according to claim 1, wherein said memory is configured to store an index of the final image of each state, said method comprising:
if said child state is a state known by said server: calculating an index associated with the final image of said video sequence and comparing this calculated index with the index of the final image of the child state stored in said memory,
if the two indices are different: updating the recorded index of the final image and removing all compressed data associated with transition sequences entering and exiting this child state.

4. The method according to claim 1, comprising: if said child state is not a state known by said server: creating a new transition between said parent state and said child state, said transition being stored in said memory without said child state being modified.

5. The method according to claim 4, wherein said memory is configured to store a final image index of each state, said method comprising:
if said child state is not a state known by said server: calculating an index associated with the final image of said video sequence and verifying by said server that said index is an index stored in said memory,
if said calculated index is known by said server: creating a new transition between said parent state and said child state, said transition being stored in said memory without said child state being modified,
if said calculated index is not known by said server: creating a new state and a new transition between said parent state and said child state, the identifier of said new state and said transition being stored in said memory.

6. The method according to claim 1, wherein said memory includes a buffer memory acting as a queuing system capable of receiving said video sequences before they are compressed, said method comprising:
if said child state is not a state known by said server: calculating the size of said video sequence for broadcasting,
if the size of said video sequence falls below a predetermined threshold and if said video sequence is not already in said queue or in the process of compression: compressing said video sequence and broadcasting by said server to said terminal the compressed data associated with said video sequence in addition to the broadcasting of the last image of said video sequence associated with the transition from said parent state to said child state,
if the size of said video sequence exceeds the aforementioned predetermined threshold and if said video sequence is not in the queue or in the process of compression: including said sequence in the queue in preparation for its compression and broadcasting by said server to said terminal the last image of said video sequence associated with the transition from said parent state to said child state.

7. The method according to claim 4, wherein said memory is configured to store an index of the final image of each state, including a buffer memory acting as a queuing system capable of receiving said video sequences before they are compressed, said child state associated with the creation of a new transition between said parent state and said child state taking any value at first, said method comprising:
calculating the size of said video sequence for broadcasting,
if the size of said video sequence falls below a predetermined threshold and if said video sequence is not already in said queue or in the process of compression: compressing said video sequence and broadcasting by said server to said terminal the compressed data associated with said video sequence in addition to the broadcasting of the last image of said video sequence associated with the transition from said parent state to said child state,
if the size of said video sequence exceeds the aforementioned predetermined threshold and if said video sequence is not in said queue or in the process of compression: including said sequence in the queue in preparation for its compression and broadcasting by said server to said terminal the last image of said video sequence associated with the transition from said parent state to said child state,
calculating an index associated with the final image of said video sequence and verifying by said server that said index is an index stored in said memory, if said calculated index is known by said server: updating any value of said child state, the transition from the parent state to the updated child state being stored in said memory without said child state being modified, if said calculated index is not known by said server: updating any value of said random child state and creating a new child state, the identifier of said new state and the transition between the parent state and the child state being stored in said memory.

8. The method according to claim 1, wherein said memory is configured to store a variable indicating the date when the compressed data stored was last used, said method including freeing up space in said memory, said freeing-up being performed by deleting in order of priority the compressed data displaying the oldest date of last use.

9. The method according to claim 1, comprising freeing up space in said memory, said freeing-up being performed as a function of the time needed to compress the compressed data stored in said memory.

10. The method according to claim 1, wherein part of the compressed data is stored in memory located in said client terminal.

11. The method according to claim 1, wherein the compression of data by said server is performed according to standard H264.

12. The method according to claim 1, wherein the compression of data may only take place in modified zones of video sequence images.

* * * * *